(12) United States Patent
Shoji et al.

(10) Patent No.: US 12,625,239 B2
(45) Date of Patent: May 12, 2026

(54) APPARATUS AND METHOD FOR CONFIGURING AND OPERATING A LASER SCANNER APPARATUS

(71) Applicant: Omron Corporation, Kyoto (JP)

(72) Inventors: Takeshi Shoji, Kyoto (JP); Fred Schleifer, Spencer, NY (US)

(73) Assignee: OMRON CORPORATION, Kyoto (JP)

( * ) Notice: Subject to any disclaimer, the term of this patent is extended or adjusted under 35 U.S.C. 154(b) by 1146 days.

(21) Appl. No.: 17/582,583

(22) Filed: Jan. 24, 2022

(65) Prior Publication Data

US 2022/0236390 A1 Jul. 28, 2022

Related U.S. Application Data

(60) Provisional application No. 63/141,549, filed on Jan. 26, 2021.

(51) Int. Cl.
| | |
|---|---|
| G01S 7/497 | (2006.01) |
| G01S 7/481 | (2006.01) |
| G01S 17/08 | (2006.01) |

(52) U.S. Cl.
CPC ............ G01S 7/497 (2013.01); G01S 7/4814 (2013.01); G01S 17/08 (2013.01)

(58) Field of Classification Search
None
See application file for complete search history.

(56) References Cited

U.S. PATENT DOCUMENTS

| | | |
|---|---|---|
| 8,995,577 B2 | 3/2015 | Ullrich et al. |
| 2003/0066891 A1 | 4/2003 | Tsi et al. |

(Continued)

FOREIGN PATENT DOCUMENTS

| | | |
|---|---|---|
| JP | H04145391 A | 5/1992 |
| JP | H08220214 A | 8/1996 |

(Continued)

OTHER PUBLICATIONS

English machine translation of Akasu (JP H04145391 A) (Year: 1992).*

(Continued)

*Primary Examiner* — Walter L Lindsay, Jr.

*Assistant Examiner* — Geoffrey T Evans

(74) *Attorney, Agent, or Firm* — Murphy, Bilak & Homiller, PLLC

(57) ABSTRACT

One or more types of laser scanner apparatuses perform object detection by emitting laser pulses and detecting corresponding reflected pulses by correlating a digitized detection signal against a correlation template representing a characteristic signal pulse. Regions of the digitized detection signal exhibiting high correlation with the template correspond to reflection pulses caused by backscattering of the emitted laser pulses. A calibration system and corresponding calibration method improve detection operations by such laser scanner apparatuses by producing a high-resolution correlation template. Among the several advantages associated with the system and method is the ability to produce correlation templates of high resolution, without requiring any increase in the base sampling rate of the digitizers used by the calibration system and the laser scanner apparatuses for digitizing their respective detection signals.

12 Claims, 7 Drawing Sheets

(56)                  References Cited

U.S. PATENT DOCUMENTS

| | | |
|---|---|---|
| 2008/0121689 A1 | 5/2008 | Good et al. |
| 2008/0246943 A1 | 10/2008 | Kaufman et al. |
| 2009/0084857 A1 | 4/2009 | Silverbrook et al. |
| 2011/0038442 A1* | 2/2011 | Ullrich .................... G01S 7/497 |
| | | 375/340 |
| 2016/0097716 A1 | 4/2016 | Gulati et al. |
| 2018/0017672 A1 | 1/2018 | Warke et al. |
| 2018/0088216 A1 | 3/2018 | Gill et al. |
| 2020/0025926 A1 | 1/2020 | Asghari et al. |
| 2020/0166643 A1 | 5/2020 | Stutz et al. |

FOREIGN PATENT DOCUMENTS

| | | |
|---|---|---|
| JP | 2012533748 A | 12/2012 |
| JP | 2013534639 A | 9/2013 |
| JP | 2014006257 A | 1/2014 |
| JP | 2019522221 A | 8/2019 |
| JP | 2020523568 A | 8/2020 |

OTHER PUBLICATIONS

"Partial Supplementary European Search Report", PCT/US2022013493, Nov. 25, 2024, 17 pages.
Goda, K , "Hybrid Dispersion Laser Scanner", Scientific Reports, Jun. 8, 2012, 8 pages.
"Extended European Search Report", PCT/US2022013493, Mar. 5, 2025, 1-17.

* cited by examiner

APPARATUS AND METHOD FOR CONFIGURING AND OPERATING A LASER SCANNER APPARATUS

TECHNICAL FIELD

Various embodiments of an apparatus and method for configuring a laser scanner apparatus are disclosed herein, along with corresponding embodiments of a laser scanner apparatus and methods thereof.

BACKGROUND

A typical laser scanner apparatus, or simply "scanner," emits a laser pulse into a surrounding physical environment and detects one or more "return" or "reflection" pulses, as backscattered from one or more objects in the surrounding environment. By way of example, a scanner may "sweep" a defined angular range within a horizontal plane, e.g., 180 degrees, or it may sweep through defined horizontal and vertical ranges, emitting one or more pulses at each angular step and correspondingly monitoring for backscattered light. Monitoring for return reflections with respect to each emitted laser pulse may be confined to an interval corresponding to minimum and maximum detection distances of the scanner—i.e., a working "detection" range"—according to time-of-flight (ToF) principles.

An example scanner includes a transmitter arrangement operative to emit laser pulses and a receiver arrangement operative to detect corresponding backscattered light. For example, the scanner includes a photodetector that outputs a photodetector signal that varies responsive to backscattered light impinging on the photodetector, such that "return" laser pulses received by the scanner, i.e., reflected pulses corresponding to an emitted laser pulse, manifest themselves as signal pulses in the photodetector signal.

According to that arrangement, detection of objects within a scanning range of the scanner comprises emitting a laser pulse and monitoring the photodetector signal for signal pulses representative of the return reflections. Determining the temporal offset—the timewise location—of such signal pulses in relation to the transmission time of the outgoing laser pulse allows the scanner to estimate object distance, according to Time-of-Flight (ToF) calculations.

Challenges arise not only from the inherently high measurement speeds involved in determining the ToF of a laser pulse, but also from the need for good noise immunity and accurate pulse discrimination. Here, "pulse discrimination" may also be referred to as "pulse detection" or "pulse identification," and it refers to the ability of the scanner to accurately detect signal pulses within the photodetector signal that represent return reflections.

SUMMARY

One or more types of a laser scanner apparatus perform object detection by emitting laser pulses and detecting corresponding reflected pulses by correlating a digitized detection signal against a correlation template representing a characteristic signal pulse. Regions of the digitized detection signal exhibiting high correlation with the template correspond to reflection pulses caused by backscattering of the emitted laser pulses. A calibration system and corresponding calibration method improve detection operations by such laser scanner apparatuses by producing a high-resolution correlation template. Among the several advantages associated with the system and method is the ability to produce correlation templates of high resolution, without requiring any increase in the base sampling rate of the digitizers used by the calibration system and the laser scanner apparatuses for digitizing their respective detection signals.

A method performed by a calibration system for a defined type of laser scanner apparatus comprises, in an example embodiment, setting a digitizer of the calibration system to each sampling phase, among a plurality of sampling phases that are incrementally offset relative to a starting phase by a phase increment that is a fraction of a sampling rate of the digitizer. For each sampling phase, the method includes obtaining a sample set via the digitizer, with the sample set comprising digital samples of a signal pulse within a photodetector signal output by a photodetector of the calibration system. The digital samples are spaced according to the sampling rate, and the signal pulse corresponds to impingement of a reflection pulse impinging on the photodetector, with the reflection pulse being backscattered by an object illuminated by a laser pulse output by a laser transmitter of the calibration system.

The method further includes the calibration system generating a merged version of the sample sets, as a reference sample set having digital samples spaced according to the phase increment and storing the reference sample set as a correlation template. A laser scanner apparatus of the defined type detects objects by emitting laser pulses and detecting corresponding reflected pulses by correlating a photodetector signal of the laser scanner apparatus with the correlation template, over an interval corresponding to a detection range of the laser scanner apparatus. With the resolution of the correlation template being increased over the sampling rate of the involved digitizer, the laser scanner apparatus advantageously operates with a higher-fidelity reference for detecting reflection pulses in its photodetector signal, while allowing it to operate with a digitizer having the same underlying sampling rate used by the calibration system.

In another example embodiment, a calibration system is operative to generate a correlation template for a defined type of laser scanner apparatus. The calibration system includes a laser transmitter, a photodetector, a digitizer, and processing circuitry. The processing circuitry is configured to set the digitizer to each sampling phase, among a plurality of sampling phases that are incrementally offset relative to a starting phase by a phase increment that is a fraction of a sampling rate of the digitizer. That is, the plurality of sampling phases uniformly subdivides the time interval associated with the sampling rate.

For each sampling phase, the processing circuitry is configured to obtain a sample set via the digitizer, the sample set comprising digital samples of a signal pulse within a photodetector signal output by the photodetector. The digital samples are spaced according to the sampling rate, and the signal pulse corresponds to impingement of a reflection pulse impinging on the photodetector, with the reflection pulse being backscattered by an object illuminated by a laser pulse output by the laser transmitter. The object, for example, is a test object of a specified size and reflectivity, which is positioned at a fixed location and orientation relative to the calibration system, for generation of the correlation template.

The processing circuitry of the calibration system is further configured to generate a merged version of the sample sets, as a reference sample set having digital samples spaced according to the phase increment and store the reference sample set as the correlation template. With these operational configurations, the processing circuitry operates to produce the correlation template with a higher time resolution than what is provided by the sampling rate of the digitizer used to digitize the detection signal—i.e., the photodetector signal produced by the photodetector of the calibration system. Correspondingly, a laser scanner apparatus of the defined type detects objects by emitting laser pulses and detecting corresponding reflected pulses by correlating a photodetector signal of the laser scanner apparatus with the correlation template, over an interval corresponding to a detection range of the laser scanner apparatus.

In one embodiment of a method performed by a laser scanner apparatus, the method includes transmitting a laser pulse from the laser scanner apparatus and digitizing a photodetector signal over an interval referenced to transmission of the laser pulse, to obtain a series of digital samples having a first time resolution established by a sampling rate of a digitizer used for the digitizing. Further, the method includes the laser scanner apparatus up-sampling the series of digital samples or at least subsets within the series of digital samples corresponding to detected peaks, to obtain one or more up-sampled series of digital samples having a second time resolution that is higher than the first time resolution by an up-sampling factor.

Still further, the example method includes the laser scanner apparatus searching for signal pulses in the one or more up-sampled series of digital samples that are representative of the laser scanner apparatus receiving reflected pulses corresponding to the transmitted laser pulse. Here, the laser scanner apparatus performs the searching by correlating the one or more up-sampled series of digital samples with a correlation template comprising a reference set of samples representing a nominal reflection-pulse shape sampled at the second resolution.

Of course, the present invention is not limited to the above features and advantages. Those of ordinary skill in the art will recognize additional features and advantages upon reading the following detailed description, and upon viewing the accompanying drawings.

DETAILED DESCRIPTION

Figures 1, 2:
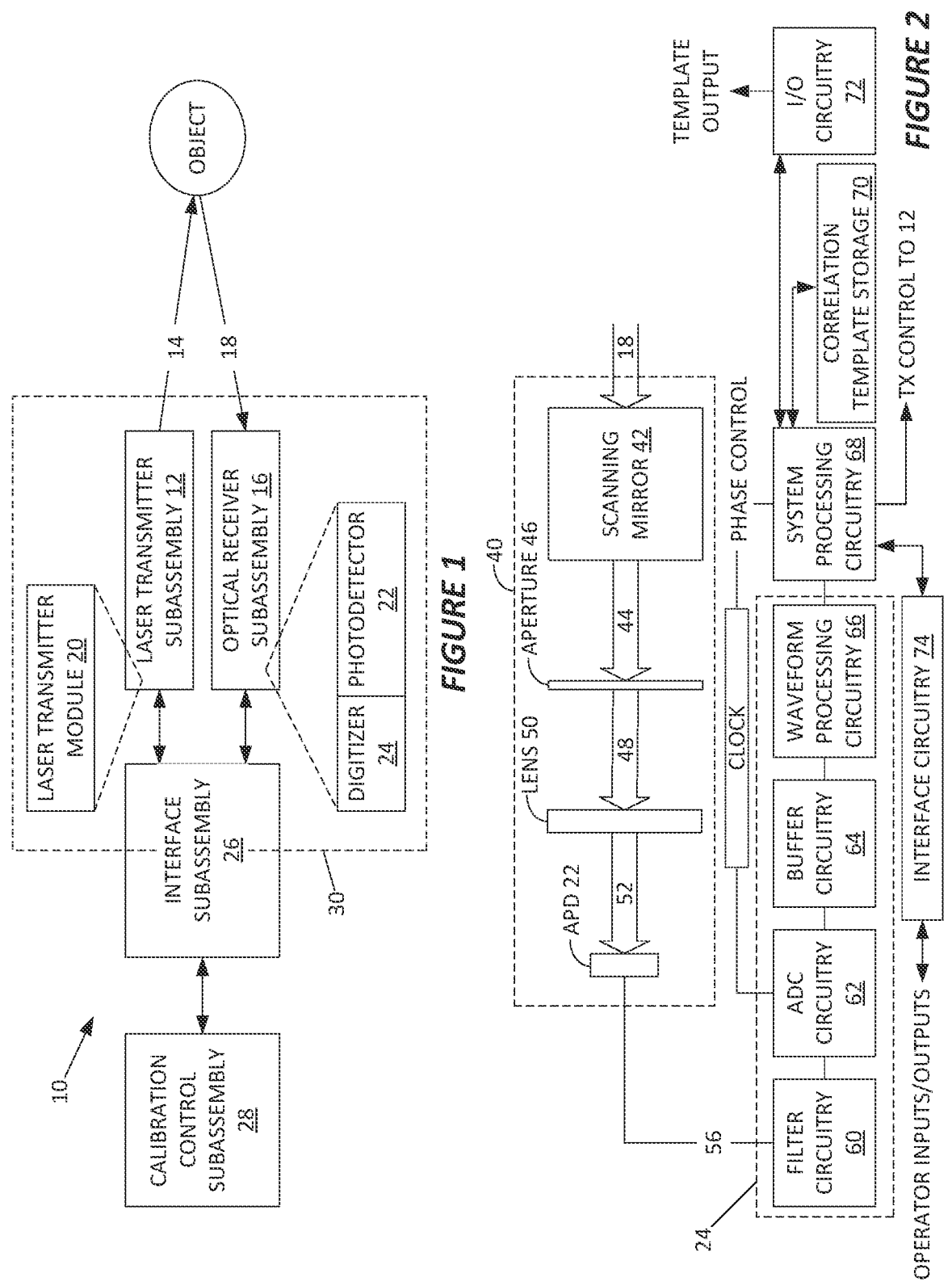
FIG. 1 is a block diagram of one embodiment of calibration system, according to one embodiment.
FIG. 2 is block diagram of example details for a calibration system, according to one embodiment.

FIG. 1 depicts an example calibration system 10, which may also be referred to as "configuration system 10" or simply "system 10." As a non-limiting example, the system 10 generates and outputs certain configuration information for use by a defined type of laser scanner apparatus. The system 10 may be used in a manufacturing environment, for example, and allow authorized users to generate and save the configuration information, e.g., for loading into laser scanner apparatuses.

The saved configuration information comprises, for example, a "correlation template" that serves as a reference for pulse detection by laser scanner apparatuses of the defined type. Particularly, laser scanner apparatuses of the defined type detect objects in their surrounding physical environments by emitting laser pulses and detecting corresponding return pulses via a photodetector. The correlation template comprises sample points defining a high-resolution pulse having a characteristic pulse shape, for correlation with the photodetector signal. As such, the correlation template provides improved reliability and accuracy in detecting and recognizing return pulses manifested within in the photodetector signal.

With the above context in mind, the system 10 includes a laser transmitter subassembly 12 that is configured to transmit a laser beam 14—e.g., a laser pulse—into its surrounding physical environment. Assuming the emitted laser pulse strikes an object of sufficient reflectivity and size, and within the distance limits of detectability, an optical receiver subassembly 16 receives a portion of the backscattered light, with the received portion denoted as backscattered light 18.

The example laser transmitter subassembly 12 includes a laser transmitter module 20 operative to emit laser pulses. Included in the example optical receiver subassembly 16 are a photodetector 22 and a digitizer 24. A photodetector signal output by the photodetector 22 varies as a function of the backscattered light 18—or at least a portion thereof—being directed onto an active surface of the photodetector 22. Digitizing the photodetector signal via the digitizer 24 provides the system 10 with the ability to "capture" the photodetector signal over an interval referenced to the transmission of a laser pulse. The length or duration of the interval extends at least to a time (relative to the transmission time) corresponding to a defined maximum object-detection distance. As explained above, the photodetector signal manifests or exhibits signal pulses responsive to the reception of reflection pulses into the optical receiver subassembly 16.

In one or more embodiments, the system 10 further includes an interface subassembly 26 and a calibration control subassembly 28. In at least one such embodiment, the calibration control subassembly 28 comprises a computer system or test apparatus, such as a Personal Computer (PC) based test system, running one or more programs that allow a human operator to provide a command or other form of input to initiate calibration operations, etc. In such embodiments, the interface subassembly 26 may be distributed between the calibration control subassembly 28 and a laser scanner portion 30 of the system 10. As an example, the calibration control subassembly 28 has one or more interface ports and associated circuitry, such as a serial or parallel port, a USB port, etc., the laser scanner portion 30 includes a compatible port/circuitry.

As an example, the laser scanner portion 30 of the system 10 is a working example of the type of laser scanner apparatus for which the calibration template is generated. The working example may be removably connected, such that any given laser scanner apparatus can be used as the laser scanner portion 30 of the system 10, or it may be a dedicated unit and it may not necessarily be in fullyassembled portion. An advantageous aspect of this arrangement is that the opto-electronic performance and behaviors of the laser scanner portion 30 of system 10 is guaranteed to match the general characteristics of the laser scanner apparatuses of the defined type if, in fact, the system 10 incorporates the same opto-electronics and waveform processing subsystems used by such apparatuses.

FIG. 2 illustrates example details for an optical receive path 40 implemented in whole or in part within the optical receiver subassembly 16. The example arrangement includes a scanning mirror 42 that is configured to project the backscattered light 18 received at the optical receiver subassembly 16 as a projected beam 44, towards an aperture 46. The projected beam 44 passes completely or partly through the aperture 46. Correspondingly, the backscattered light 48 passed by the aperture 46 impinges on the lens 50 and is focused towards the photodetector 22, as focused light 52. In at least one embodiment, the photodetector 22 is an avalanche photodiode, which is denoted in FIG. 2 as an "APD."

A photodetector signal 56 output from the photodetector 22 is an electrical signal that responds to backscattered light impinging on its active surface area. In at least one embodiment, the photodetector signal 56 is an analog electrical signal that increases in amplitude in proportion to the optical power received at the active surface of the photodetector 22. Return reflections of the transmitted laser beam 14 that are received at the system 10 as backscattered light 18 are manifested in the photodetector signal 56 as signal pulses having a peak amplitude corresponding to the peak optical power impinging on the photodetector 22. One transmitted laser beam 14 may produce multiple reflections, and the photodetector signal 56 may exhibit multiple signal pulses over the interval of interest, along with spurious movements and other noise.

Filter circuitry 60 provides some noise rejection and bandwidth limiting of the photodetector signal 56, in advance of analog-to-digital converter (ADC) circuitry 62, which outputs a series of digital samples over the interval of interest, for temporary storage in a buffer circuitry 64. Waveform processing circuitry 66 evaluates the series of digital samples held in the buffer circuitry 64, e.g., for peak detection and corresponding pulse identification. Collectively, such circuitry stands as one example of the digitizer 24, which is operative to capture a series of digital samples by digitizing the photodetector signal 56, after filtering or conditioning performed by the filter circuitry 60.

System processing circuitry 68 provides direct or indirect control of the laser transmitter subassembly 12 and provides direct or indirect "phase control" of the ADC circuitry 62. As an example, the system processing circuitry 68 is configured to set the digitizer 24 to each sampling phase, among a plurality of sampling phases that are incrementally offset relative to a starting phase by a phase increment that is a fraction of a sampling rate of the digitizer 24.

In one example, the phase control provided by the system processing circuitry 68 to the digitizer 24 involves controlling the phase of a clock signal that controls sampling by the ADC circuitry 62. Thus, the ADC 62 may be clocked with the sampling clock at a first or starting phase, for digitizing the photodetector signal 56 with respect to the transmission of a first laser pulse, and then clocked with the sampling clock at a second phase, for digitizing the photodetector signal 56 with respect to the transmission of a second laser pulse, and so on. The same target object and target position/orientation, and distance generally will be used for acquiring digital samples over all the phases, with the optical setup generally arranged to produce one reflection pulse per transmitted laser pulse. Such an arrangement allows the system 10 to digitize a substantially identical signal pulse within the photodetector signal 56, at each of the defined sampling phases.

That is, for each sampling phase, the system processing circuitry 68 is configured to obtain a sample set via the digitizer 24, where the sample set comprises digital samples of a signal pulse within a photodetector signal 56, as output by the photodetector 22. The digital samples are spaced according to the sampling rate of the digitizer 24, and the signal pulse corresponds to impingement of a reflection pulse impinging on the photodetector 22. That is, the reflection pulse was backscattered by an object illuminated by a laser pulse output by a laser transmitter of the system 10—i.e., the laser transmitter module 20.

The system processing circuitry 68 is further configured to generate a merged version of the sample sets, as a reference sample set having digital samples spaced according to the phase increment and store the reference sample set as a correlation template. Advantageously, a laser scanner apparatus of the defined type associated with the calibration system 10 detects objects by emitting laser pulses and detecting corresponding reflected pulses, based on correlating a photodetector signal of the laser scanner apparatus with the correlation template, over an interval corresponding to a detection range of the laser scanner apparatus.

As such, the optical and electronic characteristics of the system 10 match corresponding optical and electronic characteristics of the defined type of laser scanner apparatus. For example, the system 10 incorporates a laser transmitter subassembly 12, including the laser transmitter, and a reflected-pulse reception subassembly, including the digitizer 24 and the photodetector 22, that are configured like respective subassemblies used by the defined type of laser scanner apparatus. That is, the laser transmitter subassembly 12 and the optical receiver assembly 16 have optoelectronic performance and behaviors like those of the defined type of laser scanner apparatus, such that the correlation template is appropriate for use by laser scanner apparatuses of the defined type.

Obtaining the sample set for each sampling phase is based on, for example, the system processing circuitry 68 being configured to averaging a plurality of sample sets obtained at the sampling phase. Consider an example where the sampling phases are phase 1, phase 2, phase 3, . . . , phase n. The system 10 emits multiple laser pulses—laser beam pulses—and acquires multiple corresponding sample sets for each sampling phase and forms the "sample set" for each sampling phase by averaging together the corresponding sample sets obtained for that sampling phase.

As a further example detail, obtaining the sample set for each sampling phase is based on the system processing circuitry 68 being configured, in one or more embodiments, to control the digitizer 24 to perform digitization of the photodetector signal 56 at each of the sampling phases, by controlling a phase of a clock signal used to clock the digitizer 24. In other words, the digitizer 24 has a defined sampling rate—e.g., the clock rate of a clock signal applied to it or generated within it—and the system processing circuitry 68 directly or indirectly controls the phase of the sampling clock, to cause the digitizer 24 to obtain samples at different phases. The clock may be internal to the system processing circuitry 68 or may be a dedicated clock external to the system processing circuitry 68 and the digitizer 24 or may be internal to the ADC circuitry 62. In that case, the system processing circuitry 68 controls the clock phase by applying a control signal to the ADC circuitry 62.

In at least one embodiment, the system processing circuitry 68 is configured to divide the sample time of the digitizer 24 into N sampling phases, wherein N is an integer greater than 1, such that the correlation template has a time resolution N times greater than the sampling time. Assume a sample clock frequency of 100 MHz and a value of N=16. With this arrangement, the sample time/rate is 10 nanoseconds, with 16 sampling phases increasing that time resolution to 625 picoseconds. In other words, the "phase increment" is ⅟₁₆th of the sampling interval between two sample points taken at the defined sampling rate of the digitizer 24. Other phase increments may be used, of course, with finer phase increments yielding higher resolutions.

Consequently, rather than having digital samples at a spacing of 10 nanoseconds, the correlation template includes digital samples at a spacing of 625 picoseconds, with each such digital sample being based on one or more actual sampled value(s) of signal pulses in the photodetector signal 56, as opposed to interpolation or other "synthetic" techniques that do not provide the waveform fidelity achieved by oversampling via multiple sampling phases.

In one or more embodiments, the system processing circuitry 68 is configured to output the correlation template via a signaling interface of the system 10, for storage in one or more laser scanner apparatuses of the defined type. For example, the system processing circuitry 68 includes or has access to memory or other storage 70, for at least temporarily building and retaining the correlation template, and is configured to output the correlation via template via input/output (I/O) circuitry 72, which also may be referred to as a "signaling interface." The I/O circuitry 72 may be configured to interface with external memory or file-system storage, for subsequent transfer to multiple laser scanner apparatuses in a manufacturing context or may be configured according to the communication protocols—a defined serial link protocol—for communicating directly with laser scanner apparatuses of the defined type.

At least some aspects of operation by the system processing circuitry 68 may be controlled or initiated by a human operator (or by an external control system), and the system 10 in one or more embodiments includes interface circuitry 74, for input/output control. In this regard, the system processing circuitry 68 may be included in the laser scanner portion 30 of the system 10. For example, in one embodiment, the laser scanner portion 30 comprises a working laser scanner apparatus of the type that uses the calibration template, with the system processing circuitry 68 being the processing circuitry being implemented by running a special "calibration" program on the digital processing circuitry implemented within the laser scanner apparatus. In other embodiments, at least a portion of the system processing circuitry 68 resides in the calibration control subassembly 28—e.g., at least some of the calibration processing may be performed in a PC or other processing system used to implement the calibration control assembly.

Figure 3:
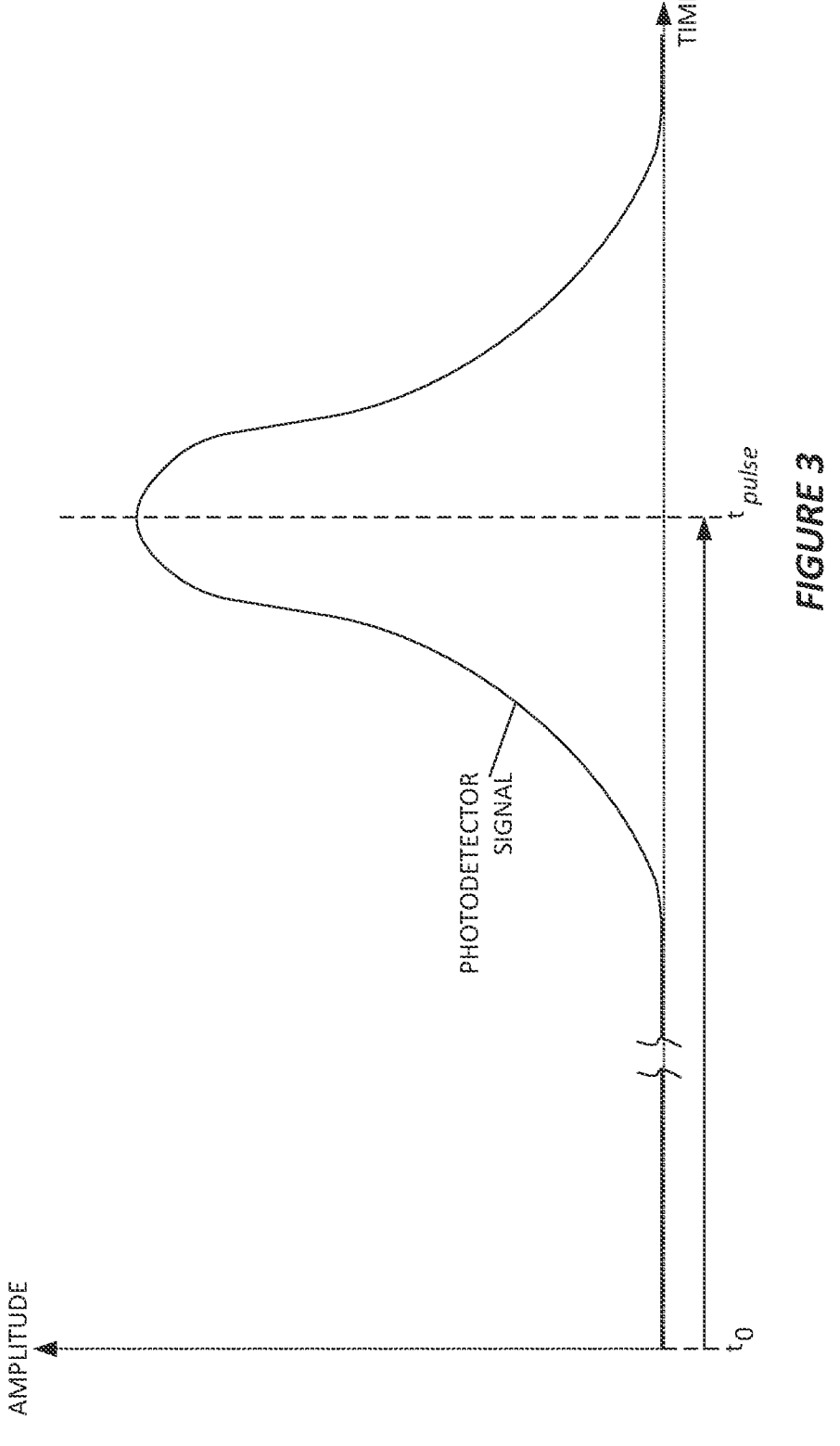
FIG. 3 is a plot of an example photodetector signal, exhibiting a pulse waveform corresponding to impingement of a reflected laser pulse on a photodetector.

FIG. 3 illustrates an example signal pulse, as manifested in the photodetector signal 56 in response to impingement of a reflected pulse on the active surface of the photodetector 22. Here, the time to refers to the transmission time of the laser pulse that yielded the reflection pulse, and the time $t_{pulse}$ corresponds to the peak of the signal pulse. As a general proposition, the same pulse shape and amplitude and time $t_{pulse}$ can be reproduced consistently, by maintaining a fixed position of a defined test target and illuminating it repeatedly, with successive laser pulses output by the laser transmitter subassembly 12. That is, substantially identical signal pulses can be obtained for multi-phase digitization, for creation of the correlation template.

Figures 4, 5:
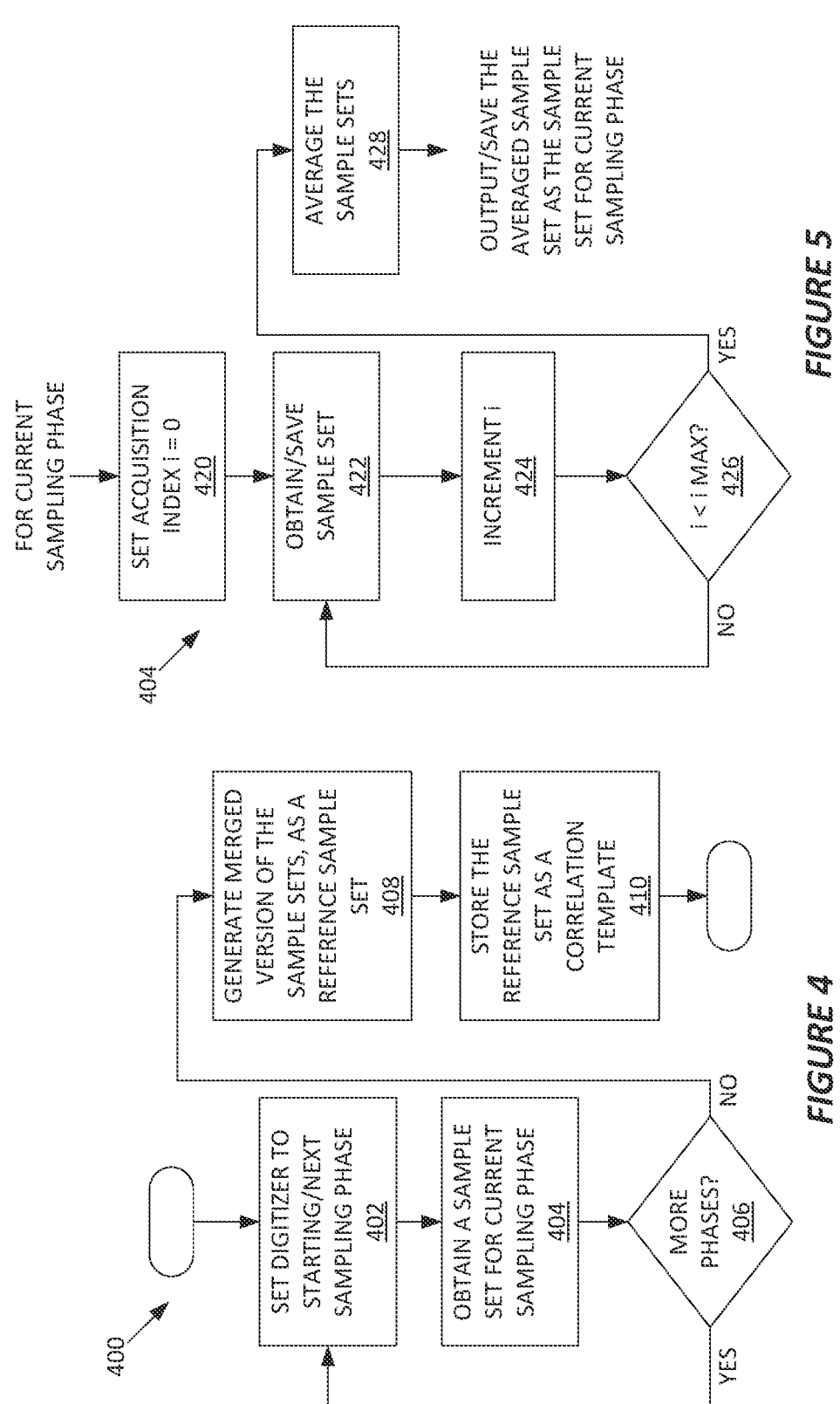
FIG. 4 is a logic flow diagram of one embodiment of a method performed by a calibration system.
FIG. 5 is a logic flow diagram of example details corresponding to the method depicted in FIG. 4.

FIG. 4 illustrates one embodiment of a method 400 of operation by a calibration system, for example, the system 10 depicted in FIG. 1. Operations comprising the method 400 may be performed as part of or in conjunction with other operations and, unless otherwise noted, may be performed in an order other than the one suggested. Further, one or more of the operations may be looped or repeated.

The method 400 is performed by a calibration system for a defined type of laser scanner apparatus and, in the illustrated embodiment, the method 400 includes setting (Block 402) a digitizer of the calibration system to each sampling phase, among a plurality of sampling phases that are incrementally offset relative to a starting phase by a phase increment that is a fraction of a sampling rate of the digitizer. Further, the method 400 includes, for each sampling phase. (Blocks 404, 406) obtaining a sample set via the digitizer, the sample set comprising digital samples of a signal pulse within a photodetector signal output by a photodetector of the calibration system, the digital samples spaced according to the sampling rate, the signal pulse corresponding to impingement of a reflection pulse impinging on the photodetector, and the reflection pulse being backscattered by an object illuminated by a laser pulse output by a laser transmitter of the calibration system.

Still further, the method 400 includes generating (Block 408) a merged version of the sample sets, as a reference sample set having digital samples spaced according to the phase increment and storing the reference sample set as a correlation template, and at least temporarily storing (Block 410) the reference sample set as a correlation template. As explained earlier, a laser scanner apparatus of the "defined type" is one that detects objects by emitting laser pulses and detecting corresponding reflected pulses by correlating a photodetector signal of the laser scanner apparatus with the correlation template, over an interval corresponding to a detection range of the laser scanner apparatus.

Optical and electronic characteristics of the calibration system used to carry out the method 400 match corresponding optical and electronic characteristics of the defined type of laser scanner apparatus. For example, the calibration system incorporates a laser transmitter subassembly, including the laser transmitter, and a reflected-pulse reception subassembly, including the digitizer and the photodetector, which are configured like respective subassemblies used by the defined type of laser scanner apparatus.

Obtaining the sample set for each sampling phase comprises, in one or more embodiments of the method 400, obtaining the sample set (the Block-404 operation) by averaging a plurality of sample sets obtained at the sampling phase. Averaging in this manner compensates for random noise, e.g., caused by "dark current" of the photodetector 22.

As a further detail, obtaining the sample set for each sampling phase comprises, for example, adjusting the digitizer to perform digitization at each of the sampling phases by controlling a phase of a clock signal used to clock the digitizer.

For example, the method 400 involves dividing the sample time of the digitizer into N sampling phases, wherein N is an integer greater than 1, such that the correlation template has a time resolution N times greater than the sampling time.

In at least one embodiment, the method 400 further includes outputting the correlation template via a signaling interface of the calibration system, for storage in one or more laser scanner apparatuses of the defined type. For example, the calibration system transfers a stored copy of the calibration template from its memory or storage, via the signaling interface.

FIG. 5 illustrates an example set of detailed steps for implementing the Block-404 operation of the method 400, with the understanding that steps are repeated for each of the sampling phases, as a "current sampling phase."

The set of detailed steps includes setting an acquisition index i to i=0 (Block 420), obtaining and saving a sample set (Block 422), incrementing i, e.g., i=i+1 (Block 424), and looping back to Block 422 if i is less than the maximum index count (NO from Block 426). Thus, for each value of i from 0 to (MAX−1), the calibration system obtains another sample set for the current sampling phase, thereby acquiring a plurality of sample sets all taken at the same sampling phase.

Once the plurality of sample sets is acquired, processing transitions to Block 428 (the YES path from Block 426). There, the calibration system averages the plurality of sample sets together to form the final or overall sample set corresponding to the current sampling phase.

Figure 6:
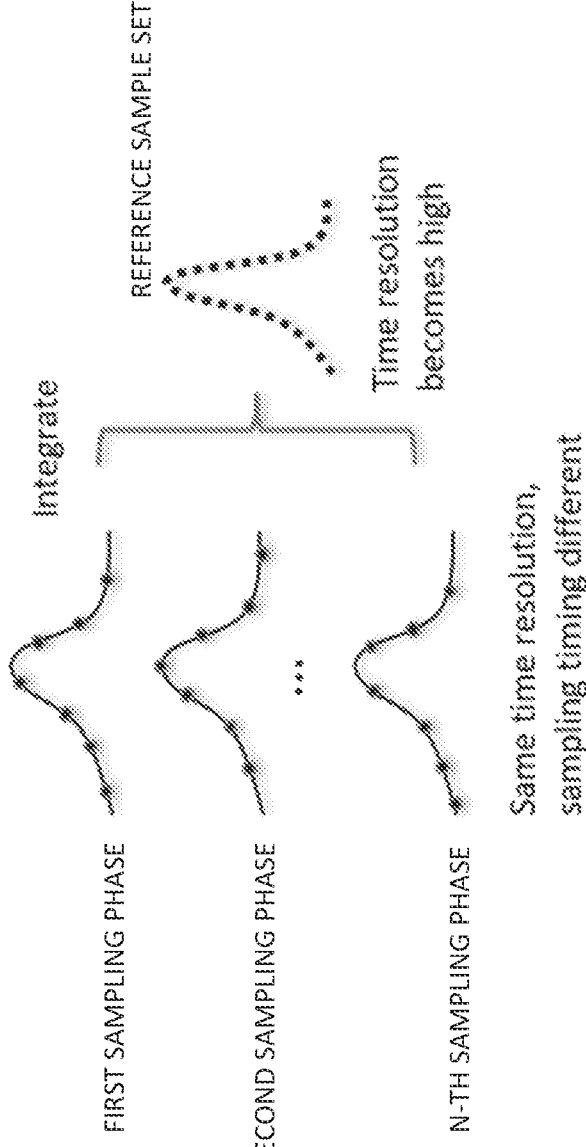
FIG. 6 depicts plots of example sampling phases, used for sampling a pulse waveform.

FIG. 6 offers a graphical illustration of building up a high-resolution reference sample set—a correlation template—based on the multi-phase sampling contemplated herein. A series of digital samples is acquired for each of N sampling phases, with each series comprising those digital samples from the photodetector signal 56 representing the signal pulse of interest. Again, assuming that the test object is the same and its distance and orientation remains fixed over multiple laser-pulse emissions, the signal pulse(s) sampled at each sampling phase will be substantially identical to the signal pulse(s) sampled at all other sampling phases, which provides for coherent combining the per-phase sample sets, to form the higher-resolution reference sample set.

Figure 7:
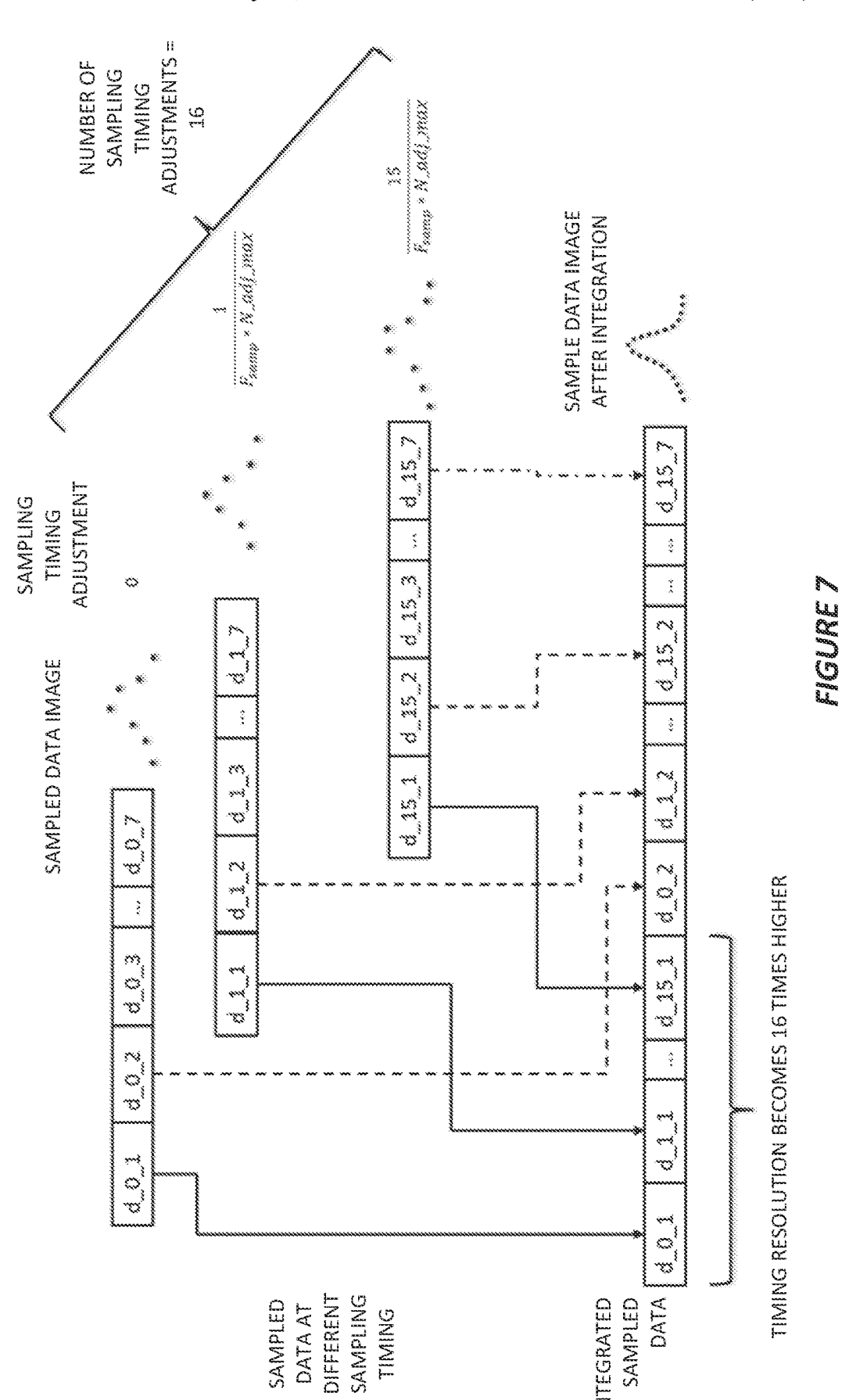
FIG. 7 is a block diagram illustrating one embodiment of merging multiple sets of digital samples taken at different sampling phases, to form a higher-resolution set of digital samples.

FIG. 7 illustrates the "assembly" process for forming the reference set in an embodiment that uses 16 sampling phases. The term $F_{samp}$ represents the sampling clock frequency, and the term N_adj_max=the incremental phase adjustment used to step through the 16 sampling phases used to subdivide the fundamental sampling interval defined by the sampling clock.

Assuming, merely as an example arrangement, the sample set obtained at each of the sixteen sampling phases comprises seven samples, spaced according to the sampling interval defined by $F_{samp}$, which is a fixed constant for purposes of this example. Thus, at a first or starting sampling phase—which may be a zero-phase offset—the process produces seven digital sample values d_0_1, d_0_2, d_0_3, . . . , d_0_7. The "d" here denotes digital sample, the "0" denotes the sampling phase, here, the zero-th phase, and the terminal number denotes the sequential sample number within the set of seven samples.

With this labeling scheme, the seven samples taken at the second sampling phase are d_1_1, d_1_2, d_1_3, . . . d_1_7, the seven samples taken at the third sampling phase are d_2_1, d_2_2, d_2_3, . . . , d_2_7, and so on, ending with the seven samples taken at the sixteenth sampling phase being d_15_1, d_15_2, d_15_3, . . . , d_15_7. The reference sample set appears at the bottom-most portion of the drawing and is referred to as the "integrated sample set" and it depicts the interleaving of the per-phase sample sets used to form the reference sample set as a high-resolution correlation template.

Figure 8:
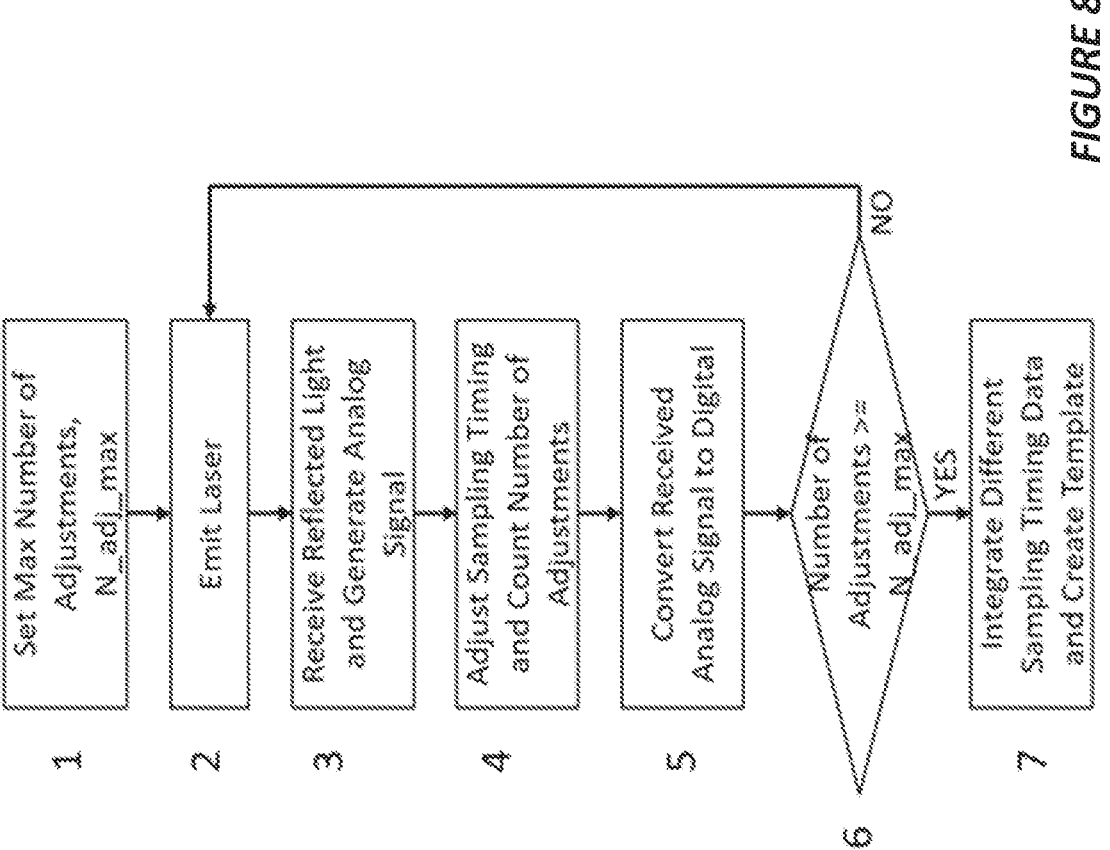
FIG. 8 is a logic flow diagram of one embodiment of another method performed by a calibration system.

FIG. 8 illustrates the data-assembly operations of FIG. 7 as a logic flow diagram including a sequence of seven steps or operations. The rust step represents a configuration or decision step, namely, determining the number of sampling phases to use, which is driven by the desired resolution for the correlation template, and practical considerations, such as the resolution practice for use in live operation of the laser scanner apparatuses that are intended to use the correlation template.

Steps 2-6 represent the processing steps performed for each sampling phase, with these steps being performed for each sampling phase, with N_adj_nax representing the overall number of sampling phases used. Step 7 represents the data interleaving used to obtain the reference sample set—the correlation template—from the sample sets obtained for all the sampling phases.

Figures 9, 10:
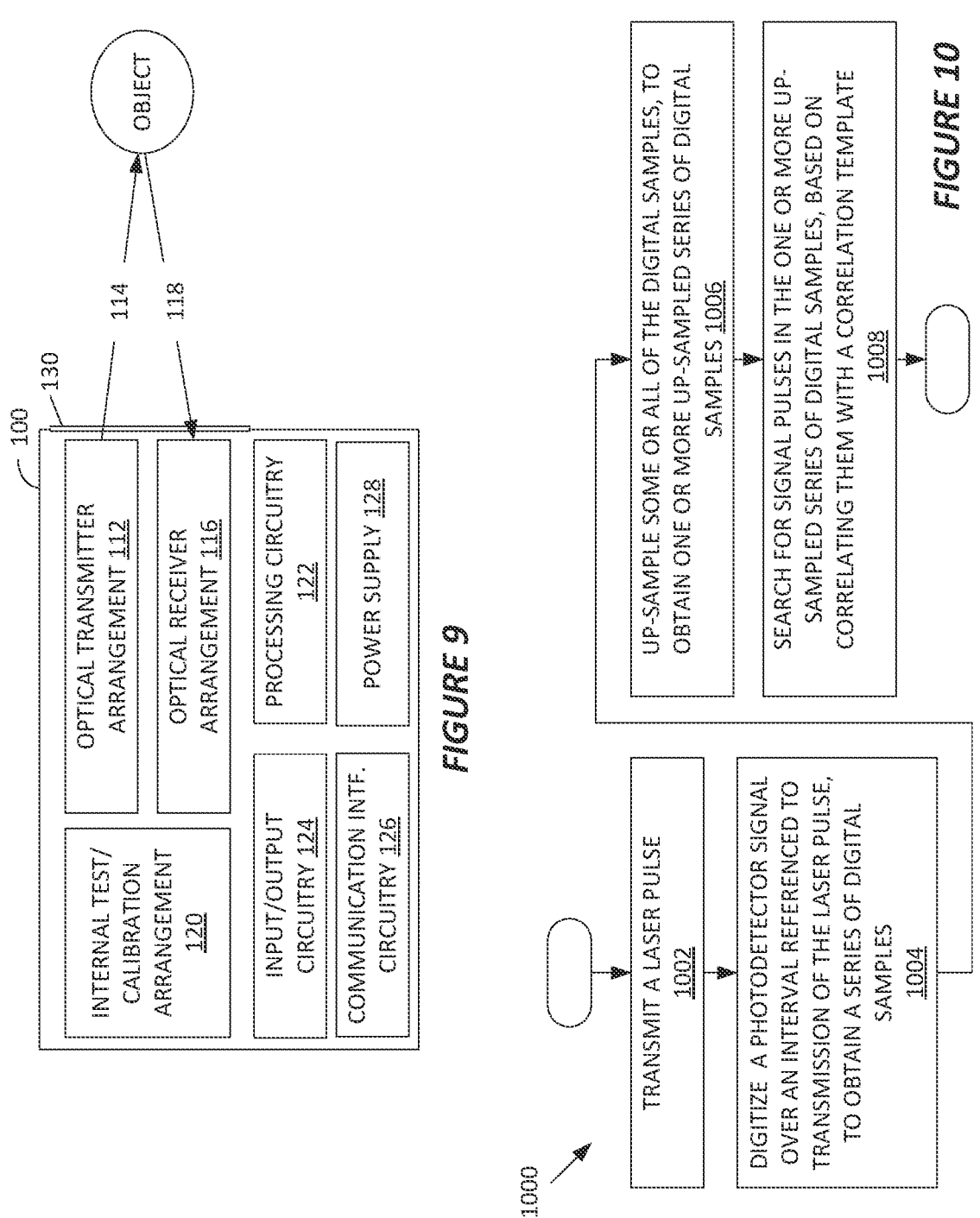
FIG. 9 is a block diagram of one embodiment of a laser scanner apparatus of a type that operates according to calibration data provided by a calibration system.
FIG. 10 is a logic flow diagram of one embodiment of a method performed by a laser scanner apparatus.

FIG. 9 illustrates an example laser scanner apparatus 100 of a type that uses a correlation template as described herein, during "live" object-detection operation. The laser scanner apparatus 100 ("apparatus 100") includes an optical transmitter arrangement 112 that may be the same as the laser transmitter subassembly 12 of the calibration system 10, or at least emits laser pulses 114 having comparable characteristics with respect to laser pulses 14 emitted by the calibration system 10.

The apparatus 100 further includes an optical receiver arrangement 116 that is configured to detect reflected pulses corresponding to the emitted laser pulses 114, which are received by the apparatus 100 as backscattered light 188 in correspondence with the emission of the laser pulses 114. The optical receiver arrangement 116 may be the same as the optical receiver subassembly 16 of the calibration system 10, at least in terms of its opto-electronic characteristics with respect to reflected-pulse detection, sampling, etc.

The apparatus 100 in an example arrangement includes an internal test/calibration arrangement 120, for verification of detection performance during live operation, processing circuitry 122, I/O circuitry 124, communication interface circuitry 126, and a power supply 128. At least some of these entities may be repurposed or otherwise used as parts of the calibration system 10, in at least some embodiments of the calibration system 10, although the apparatus 100 may execute different software or run in a special mode, when integrated as part of the calibration system 10.

In an example of operation, the apparatus 100 emits a laser pulse 114, e.g., via an optical window 130 in its housing, and monitors a photodetector signal generated within the optical receiver arrangement 116 that is responsive to backscattered light 118. Referring to FIG. 2, momentarily, the apparatus 100 includes a digitizer identical to or substantially like the digitizer 24, meaning that it obtains digital samples of the photodetector signal, for waveform processing. To detect signal pulses within the digitized photodetector signal that are representative of reflection pulses, the apparatus 100 correlates an up-sampled version of the digitized photodetector signal with a correlation template of the sort described herein.

Up-sampling may be applied to the entire series of digital samples obtained from the photodetector signal for the time interval of interest, as referenced to the time of laser pulse transmission. Alternatively, the apparatus 100 performs localized up-sampling for those portions of the digitized photodetector signal that exhibit signal peaks.

FIG. 10 illustrates a method 1000 of operation of a laser scanner apparatus, such as the apparatus 100. The method includes transmitting (Block 1002) a laser pulse, digitizing (Block 1004) a photodetector signal over an interval referenced to transmission of the laser pulse, to obtain a series of digital samples having a first time resolution established by a sampling rate of the digitizer used to digitize the photodetector signal.

The method 1000 further includes up-sampling (Block 1006) the series of digital samples or at least subsets within the series of digital samples corresponding to detected peaks, to obtain one or more up-sampled series of digital samples having a second time resolution that is higher than the first time resolution by an up-sampling factor. Further, the method 1000 includes searching (Block 1008) for signal pulses in the one or more up-sampled series of digital samples that are representative of the laser scanner apparatus receiving reflected pulses corresponding to the transmitted laser pulse. Particularly, the searching is based on correlating the one or more up-sampled series of digital samples with a correlation template comprising a reference set of samples representing a nominal reflection-pulse shape sampled at the second resolution.

In at least one embodiment of the apparatus 100, the processing circuitry 122 performs some or all the waveform processing described for the apparatus 100, including the template correlation processing. Correspondingly, the processing circuitry 122 comprises fixed circuitry or programmatically configured circuitry or a mix of both fixed and programmatically configured circuitry. Examples of the processing circuitry 122 and any other "processing circuitry" described herein include any one or any mix of one or more Field Programmable Gate Arrays (FPGAs), Complex Programmable Logic Devices (CPLDs), Application Specific Integrated Circuits (ASICs). System-on-Chip (SoC) modules. Digital Signal Processors (DSPs), microprocessors, or microcontrollers.

For example, the processing circuitry 122 comprises at least one microprocessor that includes or is accompanied by one or more types of computer-readable media that stores computer program instructions, the execution of which by the microprocessor(s) specially adapts them to carry out at least some of the apparatus operations described herein, e.g., controlling and/or monitoring the emission of laser pulses 114 and the detection of corresponding reflected pulses returned to the laser scanner apparatus 100 as backscattered light 118.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a calibration system for a defined type of laser scanner apparatus, the method comprising:

setting a digitizer of the calibration system to each sampling phase, among a plurality of sampling phases that are incrementally offset relative to a starting phase by a phase increment that is a fraction of a sampling rate of the digitizer; and for each sampling phase, obtaining a sample set via the digitizer, the sample set comprising digital samples of a signal pulse within a photodetector signal output by a photodetector of the calibration system, the digital samples spaced according to the sampling rate, the signal pulse corresponding to impingement of a reflection pulse impinging on the photodetector, and the reflection pulse being backscattered by an object illuminated by a laser pulse output by a laser transmitter of the calibration system;

generating a merged version of the sample sets, as a reference sample set having digital samples spaced according to the phase increment;

storing the reference sample set as a correlation template, wherein a laser scanner apparatus of the defined type detects objects by emitting laser pulses and detects corresponding reflected pulses by correlating a photodetector signal of the laser scanner apparatus with the correlation template, over an interval corresponding to a detection range of the laser scanner apparatus; and outputting the correlation template via a signaling interface of the calibration system, for storage in one or more laser scanner apparatuses of the defined type.

2. The method of claim 1, wherein optical and electronic characteristics of the calibration system match corresponding optical and electronic characteristics of the defined type of laser scanner apparatus.

3. The method of claim 1, wherein the calibration system incorporates a laser transmitter subassembly, including the laser transmitter, and a reflected-pulse reception subassembly, including the digitizer and the photodetector, which are configured like respective subassemblies used by the defined type of laser scanner apparatus.

4. The method of claim 1, wherein obtaining the sample set for each sampling phase comprises obtaining the sample set by averaging a plurality of sample sets obtained at the sampling phase.

5. The method of claim 1, wherein obtaining the sample set for each sampling phase comprises adjusting the digitizer to perform digitization at each of the sampling phases by controlling a phase of a clock signal used to clock the digitizer.

6. The method of claim 1, wherein the plurality of sampling phases divides the sample time of the digitizer into N sampling phases, wherein N is an integer greater than 1, such that the correlation template has a time resolution N times greater than the sampling time.

7. A calibration system operative to generate a correlation template for a defined type of laser scanner apparatus, the calibration system comprising:

a laser transmitter;

a photodetector;

a digitizer; and processing circuitry configured to:

set the digitizer to each sampling phase, among a plurality of sampling phases that are incrementally offset relative to a starting phase by a phase increment that is a fraction of a sampling rate of the digitizer; and for each sampling phase, obtain a sample set via the digitizer, the sample set comprising digital samples of a signal pulse within a photodetector signal output by the photodetector, the digital samples spaced according to the sampling rate, the signal pulse corresponding to impingement of a reflection pulse impinging on the photodetector, and the reflection pulse being backscattered by an object illuminated by a laser pulse output by the laser transmitter;

generate a merged version of the sample sets, as a reference sample set having digital samples spaced according to the phase increment;

store the reference sample set as the correlation template;

output the correlation template via a signaling interface of the calibration system, for storage in one or more laser scanner apparatuses of the defined type;

wherein a laser scanner apparatus of the defined type detects objects by emitting laser pulses and detecting corresponding reflected pulses by correlating a photodetector signal of the laser scanner apparatus with the correlation template, over an interval corresponding to a detection range of the laser scanner apparatus.

8. The calibration system of claim 7, wherein optical and electronic characteristics of the calibration system match corresponding optical and electronic characteristics of the defined type of laser scanner apparatus.

9. The calibration system of claim 7, wherein the calibration system incorporates a laser transmitter subassembly, including the laser transmitter, and a reflected-pulse reception subassembly, including the digitizer and the photodetector, which are configured like respective subassemblies used by the defined type of laser scanner apparatus.

10. The calibration system of claim 7, wherein the processing circuitry is configured to obtain the sample set for each sampling phase by averaging a plurality of sample sets obtained at the sampling phase.

11. The calibration system of claim 7, wherein the processing circuitry is configured to obtain the sample set for each sampling phase by adjusting the digitizer to perform digitization at each of the sampling phases by controlling a phase of a clock signal used to clock the digitizer.

12. The calibration system of claim 7, wherein the plurality of sampling phases divides the sample time of the digitizer into N sampling phases, wherein N is an integer greater than 1, such that the correlation template has a time resolution N times greater than the sampling time.

* * * * *